US008489612B2

(12) United States Patent
Cherkasova et al.

(10) Patent No.: US 8,489,612 B2
(45) Date of Patent: Jul. 16, 2013

(54) IDENTIFYING SIMILAR FILES IN AN ENVIRONMENT HAVING MULTIPLE CLIENT COMPUTERS

(75) Inventors: Ludmila Cherkasova, Sunnyvale, CA (US); Charles B. Morrey, III, Palo Alto, CA (US); Vinay Deolalikar, Cupertino, CA (US); Kimberly Keeton, San Francisco, CA (US); Mark David Lillibridge, Mountain View, CA (US); Craig A. Soules, San Francisco, CA (US); Alistair Veitch, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 574 days.

(21) Appl. No.: 12/409,978

(22) Filed: Mar. 24, 2009

(65) Prior Publication Data

US 2010/0250480 A1    Sep. 30, 2010

(51) Int. Cl.
*G06F 17/30*    (2006.01)

(52) U.S. Cl.
USPC .......................................................... 707/747

(58) Field of Classification Search
None
See application file for complete search history.

(56) References Cited

U.S. PATENT DOCUMENTS

| 7,269,689 | B2 | 9/2007 | Eshghi | |
| 7,660,819 | B1* | 2/2010 | Frieder et al. | 707/999.107 |
| 2003/0120647 | A1* | 6/2003 | Aiken et al. | 707/3 |
| 2007/0028304 | A1* | 2/2007 | Brennan | 726/24 |
| 2007/0250519 | A1 | 10/2007 | Fineberg | |
| 2007/0250670 | A1 | 10/2007 | Fineberg | |
| 2008/0270450 | A1* | 10/2008 | Veitch et al. | 707/102 |
| 2008/0288509 | A1* | 11/2008 | Mysen et al. | 707/100 |
| 2010/0011071 | A1* | 1/2010 | Zheleva | 709/206 |

OTHER PUBLICATIONS

Detection Mechanisms for Digital Documents, S. Brin et al., Proc. of ACM SIGMOD International Conference on Management Data, Oct. 1994 (21 pages).
On the Resemblance and Containment of Documents, A. Broder, Proc. of IEEE Conf. on the Compression and Complexity of Sequences, Jun. 1997 (9 pages).
Min-Wise Independent Permutations, A. Broder et al., Proc. of the Thirtieth Annual ACM Symposium on Theory of Computing, Dallas, Texas, May 1998 (36 pages).
Syntactic Clustering of the Web, A. Broder et al., SRC Technical Note, Jul. 1997 (13 pages).
Similarity Estimation Techniques from Rounding Algorithms, M. Charikar, Proc. of 34th Annual ACM Symposium on Theory of Computing (STOC) May 2002 (9 pages).

(Continued)

*Primary Examiner* — Bai D. Vu

(57) ABSTRACT

To identify similar files in an environment having multiple client computers, a first client computer receives, from a coordinator computer, a request to find files located at the first client computer that are similar to at least one comparison file, wherein the request has also been sent to other client computers by the coordinator computer to request that the other client computers also find files that are similar to the at least one comparison file. In response to the request, the first client computer compares signatures of the files located at the first client computer with a signature of the at least one comparison file to identify at least a subset of the files located at the first client computer that are similar to the at least one comparison file according to a comparison metric. The first client computer sends, to the coordinator computer, a response relating to the comparing.

15 Claims, 4 Drawing Sheets

OTHER PUBLICATIONS

Collection Statistics for Fast Duplicate Document Detection, A. Chowdhury et al., ACM Transactions on Infomnatin Systems (TOIS), Apr. 2002 (pp. 171-191).

On the Evolution of Clusters of Near-Duplicate Web Pages, D. Fetterly et al., Journal of Web Engineering, vol. 2, Oct. 2004 (9 pages).

Detecting Phrase-Level Duplication on the World Wide Web, D. Fetterly et al., Proc. of the 28th Annual Int. ACM SIGIR Conference on Research and Development in Information Retrieval, Salvador, Brazil, Aug. 2005 (8 pages).

Scalable Document Fingerprinting (Extended Abstract), N. Heintze, Proc. of the Second USENIX Workshop on Electronic Commerce, 1996 (10 pages).

An Analysis of Compare-by-hash, V. Henson, Proc. of the 9th conference on Hot Topics in Operating Systems, Lihue, Hawaii, 2003 (pp. 13-18).

Finding Near-Duplicate Web Pages: A Large-Scale Evaluation of Algorithms, M. Henzinger, Proc. of the 29th Annual Int. ACM SIGIR Conference on Research and Development in Information Retrieval, Seattle, Washington, 2006 (8 pages).

Methods for Identifying Versioned and Plagiarised Documents, Timothy C. Hoad et al., Journal of the American Society for Information Science and Technology, vol. 54, 2002 (18 pages).

Hash Functions, Dr. Dobb's Portal, http://www.ddj.com, Sep. 1997 (pp. 1-9).

Finding Similar Files in a Large File System, Udi Manber, TR 93-33, Oct. 1993 (10 pages).

A Low-Bandwidth Network File System, A. Muthitacharoen et al., Proc. of the 18th ACM Symposium on Operating Systems Principles, Banff, Canada, 2001 (14 pages).

Fingerprinting by Random Polynomials, Michael O. Rabin, TR-15-81, Center for Research in Computing Technology, Harvard University, 1981 (12 pages).

Building a Scalable and Accurate Copy Detection Mechanism, N. Shivakumar et al., Proc. of 1st ACM Int. Conference on Digital Libraries, Mar. 1996 (9 pages).

Finding Near-Replicas of Documents on the Web, Shivakumar et al., Proc. of Workshop on Web Databases, Valencia, Spain, 1996 (6 pages).

Finding Similar Files in Large Document Repositories, Forman et al., HP Laboratories, Palo Alto, 2005 (8 pages).

The RSYNC Algorithm, Andrew Tridgell et al., TR-CS-96-05, The Australian National University, Jun. 1996 (8 pages).

\* cited by examiner

IDENTIFYING SIMILAR FILES IN AN ENVIRONMENT HAVING MULTIPLE CLIENT COMPUTERS

BACKGROUND

Information management in a large enterprise (e.g., company, educational organization, government agency, etc.) has become increasingly complex due to the explosive growth of the number of electronic documents that are typically stored in various machines in the enterprise. In addition to maintaining electronic documents that are actively used by personnel in the organization, information management also has to address electronic documents that are stored for backup or archival purposes.

In some cases, it may be desirable to identify files that are similar to other files. An enterprise typically includes a relatively large number of client computers and a smaller number of server computers. One or more of the server computers can be designated to perform centralized data collection and processing, including processing to find similar files. The approach of using server computers to perform processing to find similar files is referred to as a "server-centric approach," where files from client computers are provided to one or more designated servers for scanning and processing. However, such a server-centric approach can lead to overloading of the one or more server computers, which can result in reduced efficiency. Moreover, providing files from client computers to the central computers also can lead to points of vulnerability that increases the likelihood of leakage of sensitive and proprietary information.

BRIEF DESCRIPTION OF THE DRAWINGS

Some embodiments of the invention are described with respect to the following figures.

DETAILED DESCRIPTION

Figure 1:
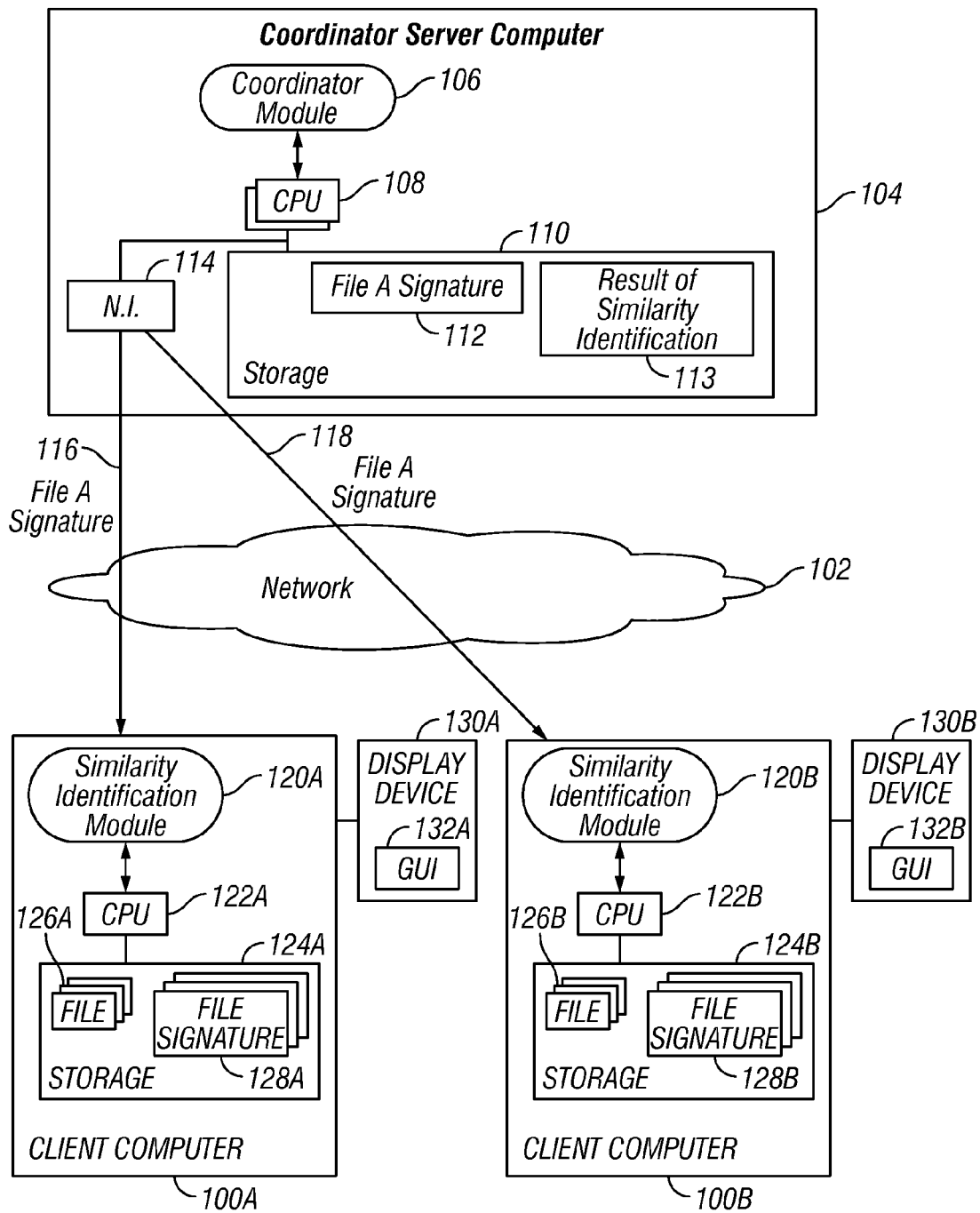
FIG. 1 is a block diagram of an exemplary arrangement of an enterprise having multiple computers, including client computers and a coordinator computer, in which some embodiments of the invention can be incorporated.

In an enterprise (e.g., company, educational organization, government agency, etc.) that has a computing environment with multiple client computers, it may sometimes be desirable to find files that are similar. For example, the enterprise may have compliance rules to specify that certain actions (e.g., deletions or other actions) are to be applied to specific files. The challenge in a large enterprise is finding where copies of such specific files are located, which can be further complicated due to the possibility that some of the copies of the files may have been slightly modified or altered by users over time. In another context, electronic discovery of files relating to litigations or government regulations may specify that a search be conducted for files that are related to various litigation issues or that are specified by government regulations. For a given set of files that have been discovered, it may be desirable to find other files that are similar to the set of discovered files, where the other similar files can include identical copies of the files in the discovered set, or files that are slightly modified or altered versions of the files in the discovered set.

In accordance with some embodiments, a scalable mechanism is provided for identifying similar files in an environment of computers. Instead of using traditional server-centric approaches in which processing associated with finding similar files is performed on designated one or more server computers, the mechanism according to some embodiments allows at least some of the tasks associated with finding similar files to be performed on client computers. By removing certain computation-intensive tasks from server computers to client computers, the loading that is placed on server computers is eased. Moreover, points of vulnerability are eliminated, since information of client computers does not have to be moved to the server computers for performing the computations associated with finding similar files. Many users may have sensitive information on their client computers that the users may not desire to be copied to a shared or central location such as a server computer. By using the mechanism according to some embodiments, the local information in client computers can be kept at the client computers (to enhance privacy) and does not have to be copied to the server computers for the purpose of identifying similar files.

The traditional server-centric approach suggests scanning the client computers and sending the information about the scanned files to the centralized server and storage location, where the user files can be analyzed for similarity. One can leverage the client computers to compute a portion of the similarity relationships for the files stored at the client computers. Such a solution helps to address the scalability issues by offloading the amount of computations (that would otherwise have to be performed at the server side) to the client computers for building the file similarity relationships.

As used here, the term "client computer" refers to any machine (e.g., desktop computer, notebook computer, personal digital assistant, communications switches, routers, storage systems, or any other electronic device) that is for use by a user or that is able to access resources (e.g., data, software, etc.) of other machines.

A "server computer" refers to any machine (computer, communications switch, router, storage system, etc.) that is able to receive requests from other computers to perform requested tasks.

Finding similar files refers to using a function that is applied to two or more files to compute a metric, where the metric is compared to a predefined threshold (or thresholds) or an expression (or expressions) for the purpose of determining whether or not the two or more files are similar. A "file" refers to any collection or grouping of information that is separately identifiable, using a file identifier, an address, a uniform resource locator (URL), or any other identifying information.

The scalability of the mechanism for finding similar files arises from the fact that client computers are used to perform computation-intensive tasks associated with finding similar files. As the number of client computers to be considered for finding similar files increases, the computational power available for performing the computation tasks associated with finding similar files on such client computers also is increased. This is compared to traditional server-centric approaches where if the number of client computers and the files contained in such client computers are increased, the loading placed on the server computer is also increased such that a bottleneck situation may result. With the traditional server-centric approach, to address the increased loading issue when the numbers of client computers and files increase, the infrastructure of server computers would have to be enhanced (such as by increasing the number of server computers or otherwise allocating additional processing power to finding similar files), which can lead to increased infrastructure costs The mechanism according to some embodiments for finding similar files is also flexible in that selection can be made regarding to which computational tasks are to be performed by client computers and which computational tasks are to be performed by designated server computer(s). The selection may be made by a user (e.g. system or network administrator). Alternatively, the selection can be made automatically based on the context in which the task of finding similar files arises. Policies also can be set that regulate the amount of computation performed at the client side versus the server side, to provide a split client-server approach of finding similar files that is policy driven.

FIG. 1 illustrates an exemplary arrangement that includes client computers 100A, 100B, and so forth. Although just two client computers are depicted in FIG. 1, it is noted that the environment of FIG. 1 can include more than two client computers. The client computers 100A, 100B are connected over a data network 102 to a coordinator server computer 104. The data network 102 can be a local area network (LAN), wide area network (WAN), a storage area network (SAN), the Internet, or other type of network.

The coordinator server computer 104 includes a coordinator software module 106 that is executable on one or more central processing units (CPUs) 108 in the coordinator server computer 104. The CPU(s) 108 is (are) connected to a storage subsystem 110. In the example of FIG. 1, the storage subsystem 110 stores a signature 112 of a particular file, referred to as file A. The "signature" of a file refers to a value that is computed based content of the file. For example, the signature can be based on applying a hash function (or multiple hash functions) to the content of the file. File A is an example of a file (also referred to as a "comparison file") for which similar files are to be identified. Although just one file signature is shown in the storage subsystem 110 of the coordinator server computer 104, it is noted that other implementations can employ multiple file signatures (associated with corresponding files) for which respective similar files are to be identified.

The coordinator server computer 104 also includes a network interface 114, which can include one or more network interface controllers and/or bus adapters. The network interface 114 allows the coordinator server computer 104 to communicate over the data network 102 with the client computers 100A, 100B.

In the example of FIG. 1, the file A signature 112 is sent (at 116) to client computer 100A. The file A signature can be sent in a request from the coordinator server computer 104 to the client computer 100A, where the request specifies that files that are similar to file A are to be identified. A request to identify files similar to file A is also sent (at 118) from the coordinator server computer 104 to the client computer 100B. The request sent at 116 can be a different request from the request sent at 118. Alternatively, the same request can be multicast or broadcast to multiple client computers. In this discussion, when referring to a request to identify similar files sent to multiple computers, the "request" can refer to a single request multicast or broadcast to multiple client computers, or alternatively, the term "request" can refer to multiple requests sent to the corresponding client computers.

The client computer 100A includes a similarity identification software module 120A that is executable on one or more CPUs 122A in the client computer 100A to perform a similar file identification operation (to find files similar to file A). The CPU(s) 122A is (are) connected to a storage subsystem 124A. The storage subsystem 124A can store various files 126A (these files are referred to "local files 126A"). Also, the storage subsystem 124A can store file signatures 128A corresponding to respective local files 126A. In one implementation, the file signatures 128A can be maintained persistently in the storage subsystem 124A, with some of the file signatures changed as files are modified or new files arrive. However, in other implementations, the file signatures 128A can be deleted after a similar file identification operation is performed, to conserve storage space in the storage subsystem 124A.

The client computer 100B contains similar components as the client computer 100A, except that the components of the client computer 100B are identified with the suffix "B" that follow reference numerals that correspond to components in the client computer 100A.

Upon receiving the request (at 116) containing the file A signature, the similarity identification module 120A in the client computer 100A performs a similar file identification operation to find a subset, if any, of the local files 126A that are similar to the file A. A "subset" of the local files 126A can refer to less than all the local files 126A or to all the local files 126A. To find similar files, the similarity identification module 120A computes file signatures for the local files 126A (if the file signatures 128A were not previously computed and already stored in the storage subsystem 124A). The file signatures computed for the local files 126A are then compared to the file A signature.

Determining whether one file is similar to another file can be accomplished using one of several algorithms. In one embodiment, a shingling-based similarity algorithm can be used. In another embodiment, a content-based chunking algorithm can be used.

With the shingling-based approach, each file is represented by a set of contiguous terms (where each term is a word) or "shingles." Two documents are compared by comparing the corresponding sets of shingles to find a number of matching shingles. For a given document D, its w-shingling, $S^w(D)$, is defined as a subset of all unique shingles of size w contained in D (if w is fixed then the notation $S(D)$ can be used instead of $S^w(D)$). Then, for a given shingle size, the resemblance or similarity of two files A and B is defined as $$sim(A, B) = \frac{S(A) \cap S(B)}{S(A) \cup S(B)}. \quad \text{(Eq. 1)}$$

Rather than comparing shingles directly, it may be more convenient to deal with fingerprints of shingles. Rabin fingerprints can be used for this purpose since they have a relatively fast software implementation. The signatures of the files are then computed based on the fingerprints. A more detailed explanation of the shingling-based approach is provided in Andrei Z. Broder, "On the Resemblance and Containment of Documents," Proceedings of IEEE Conference on the Compression and Complexity of Sequences, (June 1997).

Once a similarity metric such as sim(A, B) is computed, the similarity metric can be compared to a predefined threshold to determine whether or not files A and B are considered similar.

As noted above, another approach to defining file similarity uses content-based chunking. Content-based chunking is a way of partitioning a file into a sequence of chunks so that chunk boundaries are determined by the local content of the file. A sliding window algorithm can be used, in which a sliding window of fixed width is moved across the file, and in every position in the file, a fingerprint of the content of the sliding window is computed. The corresponding position is considered a chunk boundary if one or more predefined criteria are satisfied. Two successive boundaries define the two end points of the corresponding chunk. After chunking is performed, a file can be represented by a sequence of chunks. Corresponding hash values can be computed for respective chunks, such that each file is associated with a group of hash values that represent corresponding chunks of the file. The hash value of a chunk is produced by applying a hash function on the content of the chunk. The set of hashes that correspond to a file is considered the signature of the file.

Files A and B are X percent ($0 \leqq X \leqq 100$) similar if:

$$\frac{|\text{hashes}(A) \cap \text{hashes}(B)|}{|\text{hashes}(A) \cup \text{hashes}(B)|} * 100 \geq X. \quad \text{(Eq. 2)}$$

In Eq. 2 above, hashes(A) represents the group of hash values associated with the chunks of file A, and hashes(B) represents the group of hash values associated with the chunks of file B.

Figure 2:
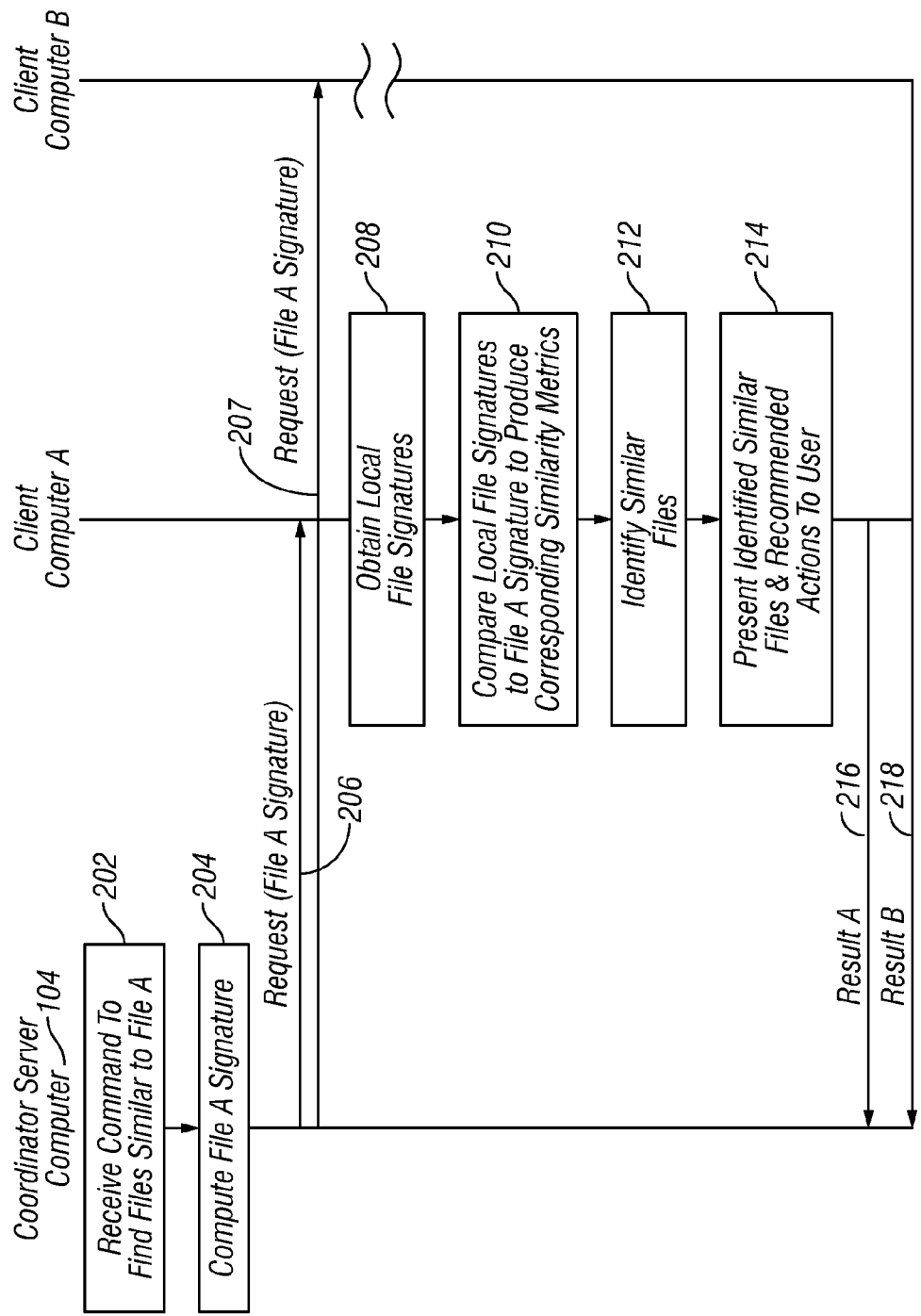
FIG. 2 is a flow diagram of a process of finding similar files in accordance with that embodiment.

FIG. 2 is a flow diagram of a process of identifying files similar to file A, according to an embodiment. The coordinator server computer 104 receives (at 202) a command to finding files similar to file A. The command can be received remotely from an administrator computer, for example. Alternatively, the coordinator server computer 104 can include a user interface (in the form of input devices and a display device) to allow a user to enter a command to find files similar to file A.

The coordinator server computer 104 computes (at 204) the signature of the file A. Alternatively, the command that is received by the coordinator server computer 104 may have already included the file A signature.

The coordinator server computer 104 then sends (at 206, 207) a request containing the file A signature to the client computers 100A and 100B. In response to the request, the client computer 100A obtains (at 208) file signatures associated with the files stored in the client computer 100A. The file signatures that are obtained have already been previously computed and stored in the storage subsystem of the client computer 100A. Alternatively, the file signatures may have to be generated from scratch by the client computer 100A, and more specifically, by the similarity identification module 120A of the client computer 100A.

The obtained signatures of the local files are compared (at 210) to the file A signature to produce corresponding similarity metrics, such as those based on Eqs. 1 and 2.

Then, based on the relationship of the similarity metrics to corresponding thresholds, local files in the client computer 100A that are similar to file A based on the similarity metrics that have been computed are identified (at 212). Once identified, the identified files and recommended action(s) are presented (at 214) to the user, such as through a graphical user interface 132A of a display device 130A connected to the client computer 100A (FIG. 1). The recommended action can be an action to delete the identified files, for example.

A message (or messages) regarding the result relating to comparing local files to file A can be sent (at 216) from the client computer 100A to the coordinator server computer 104. In some embodiments, such message(s) can include information relating to the similar file identification operation and actions taken in response to the identified files.

Similar tasks can be performed by the client computer 100B in response to receiving a request to find files similar to file A. At the client computer 100B, identified files that are similar to file A can be presented to a user along with recommended action(s). The information can be presented through a GUI 132B in a display device 130B connected to the client computer 100B (FIG. 1).

As with the client computer 100A, a message regarding the result of the similar file identification operation and actions taken in response to the identified files can be sent (at 218) from the client computer 100B to the coordinator server computer 104.

The example of FIGS. 1 and 2 can be in the context of performing document compliance, in which compliance rules of the enterprise may specify that certain actions (e.g., deletion or other actions) are to be applied to specific files (and files that are similar to such specific files). In this context, file A in the example of FIGS. 1 and 2 can be a file which is the subject of the compliance rules. When a client computer (100A or 100B) identifies local files similar to file A, the client computer will present such identified local files to the user along with recommended actions(s) as specified by the compliance rules. The compliance rules may specify that all such similar files are to be deleted. If the user fails to take the recommended action, the client computer can report back to the coordinator server computer 104 (with the message(s) sent at 216 or 218, for example) that the user has failed to take the recommended action. Any reason that was entered by the user regarding why the recommended action was not applied can also be sent to the coordinator server computer. An administrator, based on this reported result, can later perform appropriate follow up actions.

On the other hand, if the user did comply with the recommended action, then the message(s) sent back to the coordinator server computer can so indicate.

Note that the message(s) sent at 216 or 218 does not include copies of the identified similar files, in accordance with some embodiments. This helps protect the privacy of users of the client computers.

In a different context, instead of finding local files in a client computer that are similar to a particular file, a similar file identification operation can instead attempt to find local files that are similar to a set of files. One example of such a context is associated with electronic discovery of documents during litigation or that are specified by government regulation.

Figure 3:
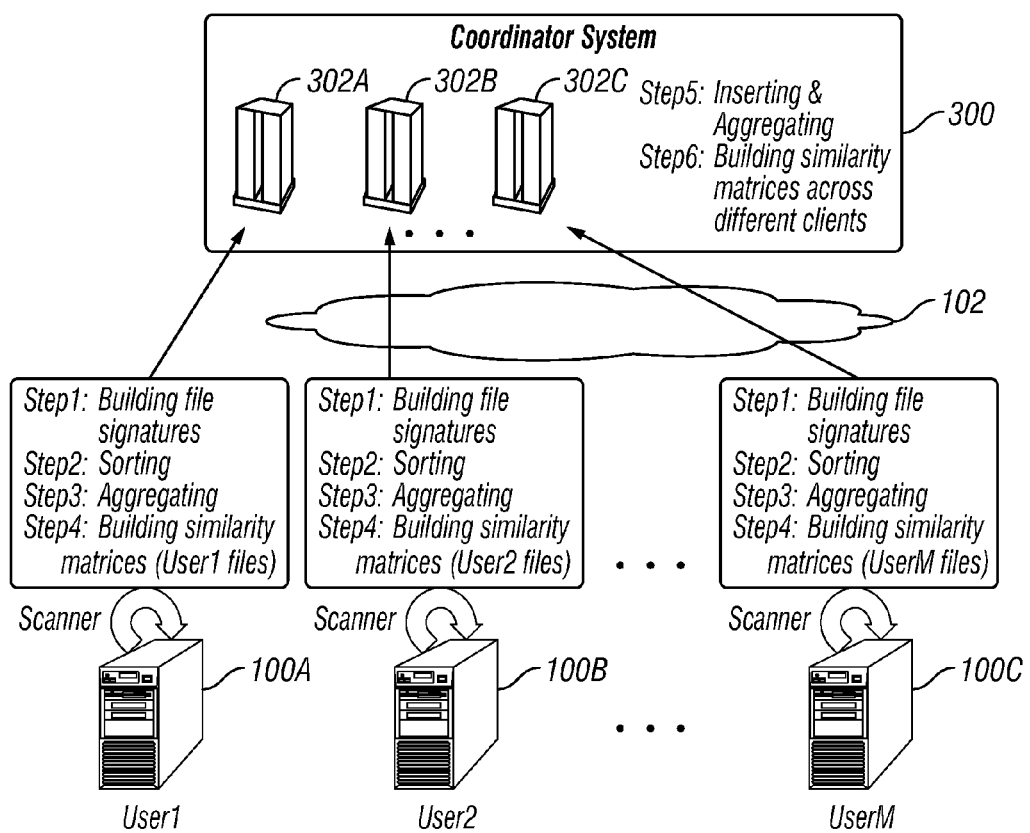
FIG. 3 is a schematic diagram to illustrate a procedure for finding similar files in an environment including client computers and a coordinator system, according to another embodiment.

FIG. 3 shows an exemplary arrangement that includes client computers 100A, 100B, 100C and a coordinator system 300 that can include one or more server computers 302A, 302B, 302C. The various tasks performed by the client computers 100A, 100B, 100C and by the coordinator system 300 are shown in FIG. 3. FIG. 3 is provided to illustrate an example of finding local files in the client computers 100A, 100B, 100C that are similar to a set of files. The set of files or file signatures can be provided by the coordinator system 300 to the client computers 100A, 100B, 100C.

Each client computer 100A, 100B, 100C performs respective general steps 1-4, including building file signatures representing local files in the respective client computer, performing sorting of the file signatures, performing aggregation, and building a similarity matrix. The similarity matrix provides indications of similarities between respective pairs of files. More generally, instead of using similarity matrices, other data structures can be used to represent similarities between pairs of files.

In step 1 in each of the client computers 100A, 100B, 100C, signatures of local files are built, where the signatures are based on chunks of the files—in other words, the signature of each file includes a set of hashes that represent corresponding chunks of the file. In an alternative embodiment, the shingling-based algorithm can be used instead to compute signatures of files. In step 2 in each of the client computers 100A, 100B, 100C, the file signatures are combined (such as into a metadata document) and sorted according to hash value, such that file-chunk metadata are ordered using hash values. A file-chunk metadata can include the following information:

{chunk size, hash value of chunk, and file ID},

Each line in the metadata document contains the fields identified above; in other words, each line of the metadata document contains a respective file-chunk metadata that includes the chunk size, hash value of the chunk, and file identifier (ID) of the file in which the chunk is located, where the file ID is unique across all the client computers. The order of the file-chunk metadata in the metadata document is according to the hash value.

After sorting (step 2) has been performed, the metadata document is arranged such that all files that refer to a chunk with the same hash value will be in adjacent lines in the metadata document. Next, information about the chunks is aggregated (step 3) in each client computer 100A, 100B, 100C, such that at the end of the aggregation, for each hash value there is a list of files that contains the corresponding chunk.

Next, each client computer performs (step 4) an operation to build a similarity matrix (or other representation of similarities between pairs of files). In some implementations, a union-find algorithm can be used to build the similarity matrix. The sorted information in the metadata document, including sorted <hash value, file ID> pairs are expanded into a list of <file x ID, file y ID, count> triplets. For each given hash value, the complete set of <file x ID, file y ID, 1> triplets is identified (note that the count has value "1" because the focus is on a given hash value. For two files (file x and file y), there can be multiple <file x ID, file y ID, count> triplets (due to multiple common hashes). Sorting and merging of the <file x ID, file y ID, 1> triplets are performed to sum the counts for matching file x ID-file y ID pairs. The result is an output list of <file x ID, file y ID, count> triplets, where count represents the number of hashes that file x and file y share. The output list of <file x ID, file y ID, count> triplets is sorted by some value, such as by the first file identifier (file x ID). This output list is the similarity matrix that represents similarity of respective pairs of files.

The outcome of each client-side similarity process (steps 1-4) is an ordered and aggregated list of hashes where for each hash there is a list of files that contains the corresponding chunk, and a similarity matrix (note that there can be one similarity matrix or multiple similarity matrices for the different files, depending on the implementation). The above similarity information is sent from each client computer 100A, 100B, 100C to the coordinator system 300. The similarity matrix is one example of a summary of similar files that can be sent from a client computer to the coordinator system.

The similarity information (ordered and aggregated list of hashes and similarity matrices) received from the multiple client computers 100A, 100B, 100C is combined at the coordinator system 300 (steps 5 and 6). Upon receipt of the similarity information from a client computer, the coordinator system 300 inserts and aggregates the similarity information with other similarity information already present (step 5). Since an ordered and aggregated hash list (let it have $K_i$ entries for client i) is received by coordinator system 300, the $K_i$ entries may be efficiently inserted into existing ordered hash list at the coordinator system 300 relatively quickly. The insertion and aggregation produces a global ordered and aggregated list of hashes. Also, a similarity matrix across the client computers 100A, 100B, 100C is built (step 6) to update counts of the <file x ID, file y ID, count> triplets discussed above using information from the multiple client computers, such that for any pair of files, the count is updated to reflect sharing of hash values in the multiple computers 100A, 100B, 100C.

After the complete similarity matrix has been built and stored at the coordinator system 300, the similarity matrix can be used to answer any similarity questions directly at the coordinator system side. Also, the coordinator system 300 can present at least one recommended action to take with respect to similar files identified by the client computers.

Figure 4:
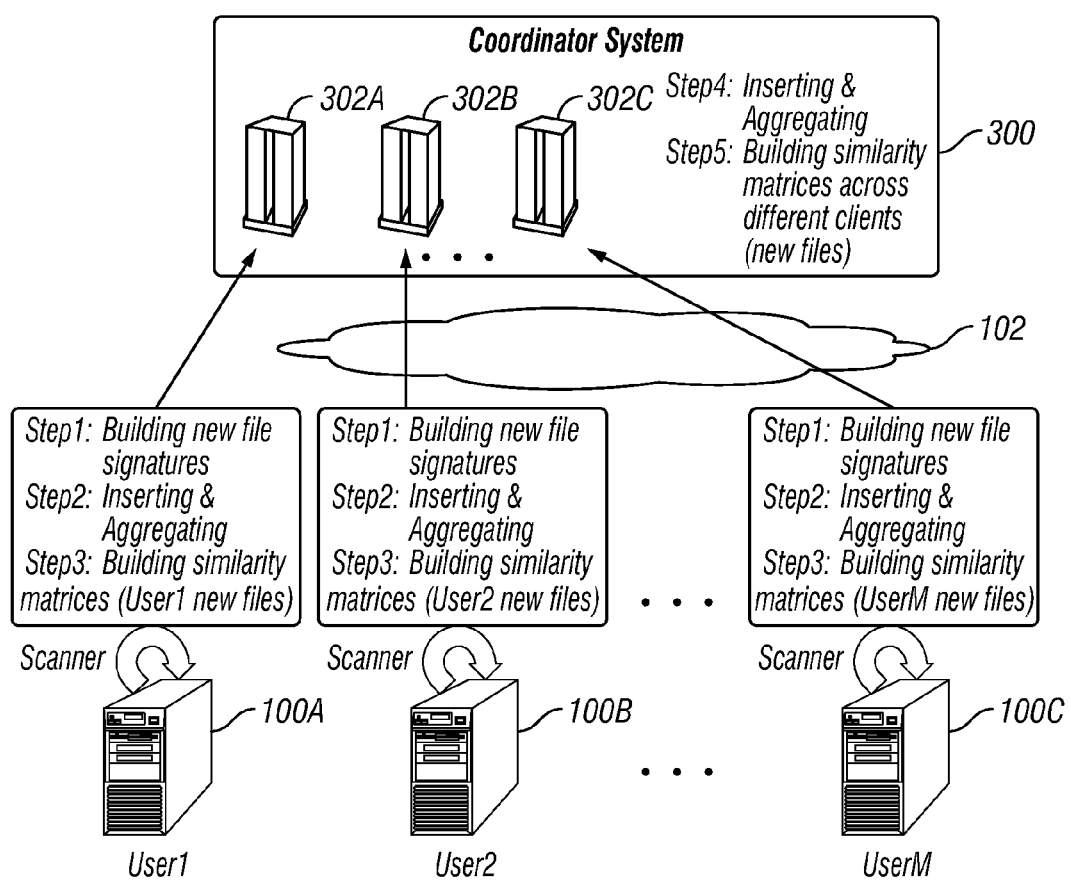
FIG. 4 is a schematic diagram to illustrate a procedure that is responsive to new file signatures, in accordance with an embodiment.

Note that each client computer 100A, 100B, 100C keeps the earlier built, ordered and aggregated list of hashes where for each hash there is a list of local files that contain the corresponding chunk, and the corresponding similarity matrix for these local files. When new content (files) is created or received at the client computer, the similar file identification process for the new content on the client side is according to the steps shown in FIG. 4.

In this optimized process, signatures for new files are constructed (step 1 in FIG. 4) in the client computer. Then the new signatures are inserted into the ordered, existing list of hashes (step 2), and the similarity matrix is built for these new files (step 3). The similarity information (ordered list and similarity matrix) for new files is sent from each client computer to the coordinator system 300, which updates the global similarity information (steps 4 and 5 in FIG. 4).

Instructions of software described above (including coordinator module 106 of FIG. 1) are loaded for execution on a processor (such as one or more CPUs 108 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMS) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method of identifying similar files in an environment having multiple client computers, comprising:
   receiving, at a first client computer from a coordinator computer, a request to find files located at the first client computer that are similar to at least one comparison file, wherein the request contains a signature of the at least one comparison file, and wherein the request has also been sent to other client computers by the coordinator computer to request that the other client computers also find files that are similar to the at least one comparison file;
   in response to the request, the first client computer comparing signatures of the files located at the first client computer with the signature of the at least one comparison file to identify at least a subset of the files located at the first client computer that are similar to the at least one comparison file according to a comparison metric, wherein each of the signatures of the files located at the first client computer includes a corresponding set of hash values representing chunks of the corresponding file, and wherein similarity of a given one of the files in the subset with the comparison file is represented by information including identifiers of the given file and the comparison file, and a count of a number of hash values shared by the given file and the comparison file; and
   sending, from the first client computer to the coordinator computer, a response produced based on the comparing, the response including an ordered list of hash values, where each corresponding hash value in the ordered list is associated with a respective list of files containing the corresponding hash value, and the response further includes a similarity data structure having plural entries each including a corresponding pair of identifiers of files and a count of a number of hash values shared by the files identified by the corresponding pair.

2. The method of claim 1, further comprising:
   presenting, by the first client computer, at least one recommended action to take with respect to the identified subset of files.

3. The method of claim 2, further comprising determining whether the at least one recommended action has been taken, wherein the response sent by the first client computer to the coordinator computer provides an indication of whether the at least one recommended action has been taken.

4. The method of claim 2, further comprising identifying the at least one recommended action based on compliance rules of an enterprise.

5. The method of claim 1, further comprising generating, at the first client computer, the signatures of the files located at the first client computer.

6. The method of claim 5, further comprising persistently storing, at the first client computer, the signatures of the files located at the first client computer, for subsequent use.

7. The method of claim 5, wherein generating the signatures of the files located at the first client computer comprises generating the signatures based on one of a shingling-based similarity algorithm and a content-based chunking algorithm.

8. The method of claim 1, wherein the at least one comparison file comprises plural comparison files associated with discovery related to litigation or government regulation.

9. The method of claim 1, further comprising:
   the coordinator computer receiving ordered lists of hash values and similarity data structures from the first client computer and the other client computers, wherein each of the similarity data structures indicates similarity of pairs of files in respective ones of the client computers.

10. The method of claim 9, further comprising:
    the coordinator computer aggregating similarity information in the similarity data structures received from the client computers to form aggregated similarity information.

11. The method of claim 1, wherein sending, from the first client computer to the coordinator computer, the response produced based on the comparing further comprises sending a collection of identified similar files.

12. The method of claim 1, further comprising:
    receiving, by the coordinator computer, summaries of similar files from the client computers in response to the request; and
    in response to the summaries, presenting, by the coordinator computer, at least one recommended action to take with respect to similar files identified by the client computers.

13. An article comprising at least one computer-readable storage medium containing instructions that upon execution cause a first client computer to:
    receive, from a coordinator computer, a request to find files that are similar to a comparison file, wherein the request contains a signature of the comparison file, wherein the request has also been sent by the coordinator computer to other client computers to find files stored in the other client computers that are similar to the comparison file;
    generate signatures for the files stored in the first client computer, wherein each of the signatures of the files in the first client computer includes a corresponding set of hash values representing chunks of the corresponding file;
    compare the signature of the comparison file to the signatures of the files stored in the first client computer to identify a subset of the files stored in the first client computer that are similar to the comparison file, wherein similarity of a given one of the files in the subset and the comparison file is represented by information including identifiers of the given file and the comparison file, and a count of a number of hash values shared by the given file and the comparison file;
    generate a response based on the comparing, the response including an ordered list of hash values, where each corresponding hash value in the ordered list is associated with a respective list of files containing the corresponding hash value, and the response further includes a similarity data structure having plural entries each including a corresponding pair of identifiers of files and a count of a number of hash values shared by the files identified by the corresponding pair; and
    send the response to the coordinator computer indicating a result of the comparing.

14. The article of claim 13, wherein the response further includes an indication of whether a predefined action was taken with respect to the identified similar files.

15. A method executed by a coordinator computer, comprising:
    sending, by the coordinator computer, a request to find files similar to at least one comparison file, wherein the request is sent to plural client computers, wherein the request contains a signature of the comparison file, and wherein the request causes each of the plural client computers to compare signatures of local files at the corresponding client computer with the signature of the comparison file; and receiving, from each of the plural client computers, a response indicating a result of the comparing at the corresponding client computer, wherein the response from each client computer includes information indicating similarity of respective pairs of files, wherein each of the signatures of the files located at the respective client computers includes a corresponding set of hash values representing chunks of the corresponding file, and wherein similarity of each of the pairs of files is represented by information including identifiers of the files in the corresponding pair, and a count of a number of hash values shared by the files in the corresponding pair, wherein the received response includes an ordered list of hash values, where each corresponding hash value in the ordered list is associated with a respective list of files containing the corresponding hash value, and the response further includes a similarity data structure having plural entries each including a corresponding pair of identifiers of files and a count of a number of hash values shared by the files identified by the corresponding pair.

* * * * *